V. E. LA POINTE.
KEYWAY CUTTER.
APPLICATION FILED APR. 30, 1919.
1,364,561.
Patented Jan. 4, 1921.
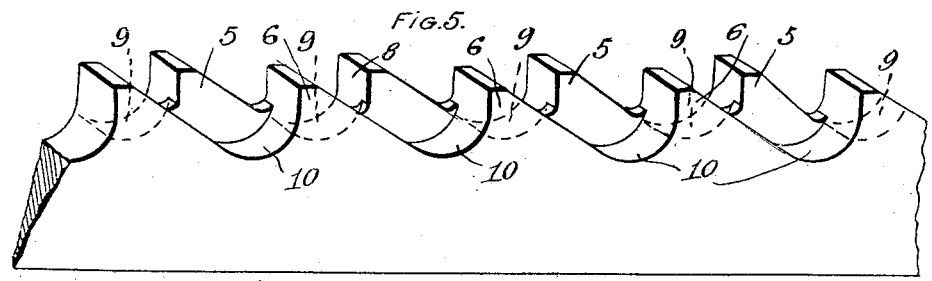
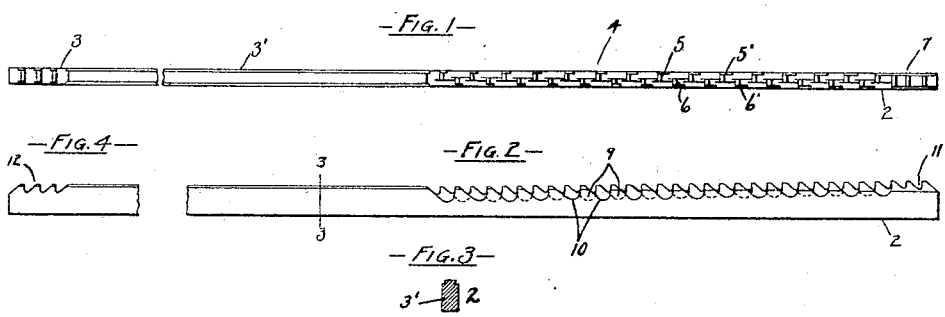
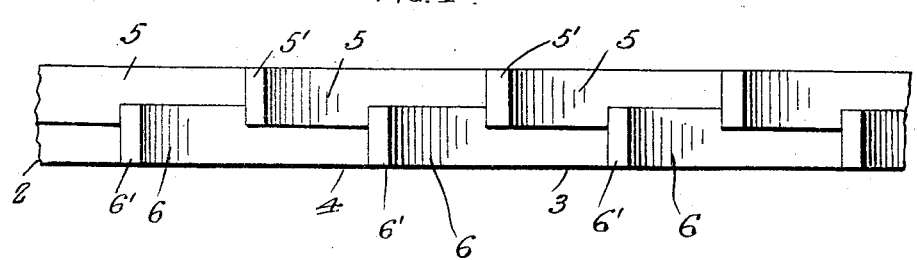
INVENTOR.
V. E. La Pointe
BY
ATTORNEY.

UNITED STATES PATENT OFFICE.

VICTOR E. LA POINTE, OF HARTFORD, CONNECTICUT, ASSIGNOR TO FRANK O. WELLS, OF GREENFIELD, MASSACHUSETTS.

KEYWAY-CUTTER.

1,364,561. Specification of Letters Patent. Patented Jan. 4, 1921.

Application filed April 30, 1919. Serial No. 293,871.

*To all whom it may concern:*

Be it known that I, VICTOR E. LA POINTE, a subject of the King of Great Britain, residing at Hartford, in the county of Hartford and State of Connecticut, have invented certain new and useful Improvements in Keyway-Cutters, of which the following is a specification.

This invention relates to what I shall for convenience term a "keyway cutter." While the article may with advantage, be employed in various ways, it is of particular utility when functioning as a broach. The tool involves certain features of advantage among them being means by which the efficiency of the same is much higher than those of the ordinary type, this coupled with the fact that proper provision is made for clearance. Another advantageous point is the manner in which the pull is applied, this being of such character as to prevent distortion of the implement during its operation.

There are other features of novelty and advantage which with the foregoing will be set forth at length in the following description wherein I will disclose in detail that form of embodiment of the invention which I have selected for illustration in the drawings accompanying and forming part of the present specification. I am not restricted to this particular disclosure; I may depart therefrom in several respects within the scope of the invention defined by the claims following said description.

Referring to said drawings:

Figure 1 is a top plan view of a cutter comprising the invention, an intermediate part being broken out and the end portions being brought together.

Fig. 2 is a side elevation of the rear portion of the implement.

Fig. 3 is a cross section of the line 3—3 of Fig. 2.

Fig. 4 is a side view of the head end of the tool.

Like characters refer to like parts throughout the several views.

As will be inferred the tool is susceptible of general use although I have found it of especial advantage when functioning as a keyway cutter bar or as might otherwise be considered, a broach. It may be formed of any of the materials from which such an article is made.

Said cutter or tool is in the form of a practically straight shank body member or bar, such as that denoted in a general way by 2. The shank or body member comprises in turn a head portion as 3, an intermediate portion as 3′ and a broaching portion as 4, the three portions generally being integral. The shank or body member 2 is ordinarily rectangular or practically so in cross section.

The broaching or operative portion 4 involves two rows of truncated teeth, the teeth of the respective rows being of progressively increasing heights outwardly or toward the right and being denoted each by 5 and 6, the teeth 5 being laterally staggered with respect to the teeth 6. Both rows of teeth it will be seen are disposed longitudinally of the tool or of the broaching portion 4 thereof. The width of the two rows is practically the same as that of the body member 2. It will be perceived that the first tooth of the row 5 is forward of the first tooth of the row 6, while the last tooth of the row 5 is back of the last tooth of the row 6. It will be perceived that the teeth of the two rows 5 and 6 are in staggered or overlapping relation.

The teeth 5 and 6 are cut away near their upper ends on their outer lateral sides, as at 5′ and 6′ respectively. In addition to these primary broaching teeth 5 and 6 there is a series of secondary teeth 7, all of the same height, at the tail or rear end of the broaching portion 4, the width of the teeth 7 being equal to that of the body portion 2 and also equal to that of the two rows of teeth 5 and 6.

These several sets of teeth 5, 6 and 7 rise from the shank 2, the width of which is equal to that of the two sets of teeth 5 and 6 and the single set of teeth 7. The front face of each of these teeth is at right angles or perpendicular to the longitudinal axis of the shank 2 while the rear faces are oblique to the front faces and also oblique to said axis. At the bases of the outer sides of the teeth 5 and at a corresponding place of the teeth 6 are reliefs or clearance portions 9 and 10 respectively, the reliefs or clearance portions 9 being staggered with relation to those designated by 10. I desire to call attention to the fact that the walls of the reliefs 9 and 10 constitute continuations of the front inclined faces of the teeth 5 and 6 of the respective rows. The teeth 7 are furnished at their base with reliefs or clearance portions 11 at opposite sides of the bases thereof while the reliefs or clearance portions 9 and 10 are concaved or dished this is not so with the mating clearance portions 11 which are somewhat flat.

The power applied for drawing the broach or tool through the work is exerted at what I have considered the head portion 3 and is applied in a novel manner so far as I am aware, and as I will now more particularly explain. A broaching tool or implement is an exceedingly old thing and it is ordinarily drawn through an openng. The draft is usually applied, however, in such a way as to tend to and actually distort the tool. In the present case the power is so applied that there is no such evil effect.

It will be observed that the head end portion is serrated as at 12. These serrations are practically in line with the cutting teeth 5, 6 and 7. The said serrations or teeth 12 are adapted to fit tooth spaces in a holder which is given an endwise movement, toward the left in Fig. 1, to draw the tool through the work. The draft is applied to the serrations or teeth 12 and does not have any tendency to flex or bend the tool in making the draw or pull upon the implement.

What I claim is:

1. An implement of the class described comprising a practically straight shank provided with longitudinally-disposed rows of teeth, the teeth of the respective rows being in staggered and overlapping relation.

2. An implement of the class described comprising a practically straight shank provided with rows of teeth of truncated V-form, the teeth of the respective rows being in staggered and overlapping relation.

3. An implement of the class described, comprising a shank provided with a plurality of rows of teeth, the teeth of the respective rows being laterally staggered and the shank having reliefs at the bases of the teeth, the walls of the reliefs constituting continuations of the fronts of the teeth.

4. An implement of the class described, comprising a shank provided with longitudinally disposed rows of teeth, the head end portion of the shank having several teeth in longitudinal alinement with and longitudinally separated from the first mentioned teeth.

5. An implement of the class described, comprising a shank provided with longitudinally disposed rows of teeth, the teeth of the respective rows being staggered with respect to each other laterally of the tool, the cutting edges of the teeth being at their tops, the shank having at its head end a second series of teeth spaced from the other teeth longitudinally of the tool and in longitudinal alinement therewith.

6. An implement of the class described, comprising a shank provided with rows of teeth, the teeth of the respective rows being laterally staggered and the shank having concaved reliefs at the bases of the teeth on the outer lateral portions of the shank.

7. An implement of the class described, comprising a shank provided with longitudinally disposed rows of teeth, the teeth of the respective rows being staggered, the rear portion of the shank having a series of non-staggered teeth.

8. An implement of the class described, comprising a shank provided with longitudinally disposed rows of teeth, the teeth of the respective rows being of increasing heights and staggered with respect to each other laterally of the tool, the shank having on its outer lateral portions concaved reliefs at the bases of the teeth and also having at its tail portion a row of teeth of uniform height.

9. An implement of the class described, comprising a shank provided with longitudinally disposed rows of teeth, the teeth of the respective rows being of increasing heights and staggered with respect to each other laterally of the tool, the shank having on its outer lateral portions concaved reliefs at the bases of the teeth and also having at its tail portion a row of teeth of uniform height, said shank having a row of teeth at its head end spaced from and in longitudinal alinement with said rows of teeth.

10. An implement of the class described, comprising a practically straight shank provided with longitudinally-disposed rows of teeth, the teeth of the respective rows being in staggered and overlapping relation, the cutting edges of the teeth being at their tops.

11. An implement of the class described comprising an elongated shank provided with longitudinally-disposed rows of teeth truncated to thus form cutting edges at the tops of the teeth, the teeth of the respective rows being in staggered and overlapping relation.

12. An implement of the class described comprising a shank provided with longitudinally-disposed rows of teeth of truncated V-form, the teeth of the respective rows being out of line with each other transversely of the shank.

13. An implement of the class described comprising an elongated shank provided with longitudinally-disposed rows of teeth of truncated V-form, the teeth of the respective rows being out of line with each other transversely of the shank, each tooth of a row being in lateral abutment with a tooth of another row.

14. An implement of the class described comprising a shank having longitudinally-disposed rows of teeth, the base portion of each tooth in a row overlapping the base portion of a corresponding tooth in another row.

15. An implement of the class described comprising a shank having longitudinally-disposed rows of teeth, the base portion of each tooth in a row overlapping the base portion of a corresponding tooth in another row, the teeth being truncated and having reliefs in said base portions.

In testimony whereof I affix my signature in the presence of two witnesses.

VICTOR E. LA POINTE.

Witnesses:
 MARGARET T. DENNIS,
 HEATH SUTHERLAND.